United States Patent
Koch et al.

(10) Patent No.: US 12,502,162 B2
(45) Date of Patent: Dec. 23, 2025

(54) SYSTEM AND METHOD FOR CONTRACEPTION

(71) Applicant: AVA AG, Zürich (CH)

(72) Inventors: Lisa Koch, Zürich (CH); Simon Andermatt, Zürich (CH); Karolin Franke, Zürich (CH)

(*) Notice: Subject to any disclaimer, the term of this patent is extended or adjusted under 35 U.S.C. 154(b) by 852 days.

(21) Appl. No.: 17/753,242

(22) PCT Filed: Aug. 21, 2020

(86) PCT No.: PCT/EP2020/073502
§ 371 (c)(1),
(2) Date: Feb. 24, 2022

(87) PCT Pub. No.: WO2021/037723
PCT Pub. Date: Mar. 4, 2021

(65) Prior Publication Data
US 2022/0287692 A1   Sep. 15, 2022

(30) Foreign Application Priority Data
Aug. 29, 2019 (EP) .................................. 19194351

(51) Int. Cl.
*A61B 10/00* (2006.01)
*G06N 5/022* (2023.01)
*G16H 40/67* (2018.01)

(52) U.S. Cl.
CPC ......... *A61B 10/0012* (2013.01); *G06N 5/022* (2013.01); *G16H 40/67* (2018.01); *A61B 2560/0431* (2013.01)

(58) Field of Classification Search
CPC ........ A61B 10/0012; A61B 2560/0431; A61B 5/43; G16H 40/67; G06N 5/022
See application file for complete search history.

(56) References Cited

U.S. PATENT DOCUMENTS

2013/0137940 A1   5/2013   Schafer
2018/0325498 A1*  11/2018  Bongiorno ......... A61B 10/0012

FOREIGN PATENT DOCUMENTS

| WO | WO 2015/143259 A1 | 9/2015 |
| WO | WO 2019/057561 A1 | 3/2019 |
| WO | WO 2020/006072 A1 | 1/2020 |

OTHER PUBLICATIONS

International Search Report and Written Opinion of the International Searching Authority for International Application No. PCT/EP2020/073502, mailed on Sep. 7, 2020, in 13 pages.

* cited by examiner

Primary Examiner — Eric F Winakur

(57) ABSTRACT

A method for determining for a female a time interval for using contraception is disclosed, the method comprising receiving in a processor (11), from a sensor system (22) of a wearable device (2) of the female, physiological data of the female, generating cycle phase probabilities of the female being in one or more cycle phases of her menstrual cycle on a given day, by use of a machine learning model and the physiological data, determining the time interval for using contraception using the physiological data, the cycle phase probabilities, and pre-determined cycle phase probability thresholds, and generating a message for the female comprising the time interval for using contraception.

15 Claims, 5 Drawing Sheets

SYSTEM AND METHOD FOR CONTRACEPTION

CROSS-REFERENCE TO RELATED APPLICATIONS

This application is the U.S. National Phase under 35 U.S.C. § 371 of International Application PCT/EP2020/073502, filed Aug. 21, 2020, which claims priority to EP Application Serial No. 19194351.3, filed Aug. 29, 2019, the entire contents of each of which are incorporated by reference herein and made a part of this specification.

FIELD OF THE INVENTION

The present invention relates to a method and system for determining for a female a time interval for using contraception. Specifically, the present invention relates to a method, a computer system, and a computer program product for determining for a female a time interval for using contraception.

BACKGROUND OF THE INVENTION

The menstrual cycle is governed by a complex interaction of hormones from the ovaries, pituitary gland, and the hypothalamus. On average, the menstrual cycle has a length of 28 days, which can be divided into the follicular phase, ovulation, and the luteal phase.

The menstrual cycle starts with the follicular phase, on the first day of which menstruation occurs. Menstruation is a period of between 2 and 7 days in the follicular cycle in which the uterus sheds its lining. During the follicular phase, follicles mature under the influence is of follicle stimulating hormone (FSH), each of them containing a single oocyte. Only one follicle, however, the dominant follicle, will develop until ovulation.

Ovulation is the release of a mature egg from the surface of the ovary and usually occurs mid-cycle. It is a peak in the levels of the luteinizing hormone (LH) that triggers ovulation. The collagenous layers of the follicular wall are proteolytically cleaved, the follicle ruptures, and the ovum is released into the fallopian tubes. The typical lifespan of an egg is only around 24 hours, and unless it is fertilized by a sperm during this time, it will die and conception is no longer possible. Together with the surge of LH, another important hormone, progesterone, starts to rise.

The luteal phase begins after ovulation and lasts approximately two weeks. The ruptured follicle remains on the surface of the ovary, and transforms into the corpus luteum. This tissue is characterized by an accumulation of lutein, a yellow carotenoid, and produces progesterone. This hormonal change alters the uterus. Its endometrial lining starts to thicken to prepare the environment for any fertilized egg to attach to the lining, a process called implantation. In the absence of a fertilized egg, progesterone levels fall and the thickened lining of the uterus is shed during the next menses, which marks the start of the next cycle.

Knowledge of the menstrual cycle and its phases is not only important for conception but also essential for contraception. There are different forms of contraceptives available.

Hormonal contraceptives release synthetic hormones into the bloodstream. The hormones can be taken in the form of a pill, a releasing ring or patch, injection or implant. Their main way of action is the prevention of ovulation, thickening of the cervical mucus and rendering the endometrium less receptive to implantation. These hormonal methods are not free is from adverse effects, however. Often reported effects are: weight gain, skin problems, breast tenderness, libido problems, depressed mood, headaches. Further, females with certain medical conditions should avoid hormonal contraceptives altogether, such conditions being a history of strokes or certain thrombotic mutations like factor V Leiden or antithrombin deficiencies.

Alternatively, non-hormonal methods, so-called barrier methods (e.g. condoms or diaphragms), which prevent the sperm from entering the uterus, are commonly employed.

Other methods take into consideration that a female is only fertile for a part of her menstrual cycle (the fertile window). To reliably determine when this fertile window begins and ends requires urine tests to measure the hormonal levels. Other methods, such as counting the number of days since the last menstruation, monitoring body temperature, monitoring cervical mucus, or a combination thereof are relatively unreliable and remain cumbersome to use.

SUMMARY OF THE INVENTION

It is an object of this invention to provide a method and system for determining for a female a time interval for using contraception. Specifically, the present invention relates to a method, a computer system, and a computer program product for determining for a female a time interval for using contraception.

According to the present invention, these objects are achieved through the features of the independent claims. In addition, further advantageous embodiments follow from the dependent claims and the description.

According to the present invention, the above-mentioned objects are particularly achieved by a computer-implemented method for determining for a female a time interval for using contraception. The method comprises receiving, in a processor, from a sensor system of a wearable device of the female, physiological data of the female. The method further comprises generating, by the processor, cycle phase probabilities of the female being in one or more cycle phases of her menstrual cycle on a given day, by use of a machine learning model and the physiological data. For example, the processor generates cycle phase probabilities of the female being in one particular cycle phase, i.e. being either in the early follicular phase, the fertile window, or the luteal phase. The cycle phases comprise an early follicular phase, a fertile window, and/or a luteal phase. The method further comprises determining, by the processor, the time interval for using contraception using the physiological data, the cycle phase probabilities, and pre-determined cycle phase probability thresholds. The method further comprises generating, by the processor, a message for the female comprising the time interval for using contraception.

In an embodiment, receiving the physiological data comprises the processor receiving one or more of: skin temperature data, breathing rate data, resting pulse rate data, heart rate variability data, perfusion data, and pulse wave analysis data.

In an embodiment, generating the cycle phase probabilities comprises the processor recording the physiological data for one or more menstrual cycles in a physiological data log. The method comprises generating the cycle phase probabilities by use of the machine learning model, the physiological data, and the physiological data log.

In an embodiment, generating the cycle phase probabilities in the processor comprises training the machine learning model to generate the cycle phase probabilities using machine learning and a training dataset of physiological training data of a large group of females. The person skilled in the art understands that training the machine learning model can be performed on a separate processor and/or at a time separate from generating the estimated time to ovulation. In particular, the machine learning model can be trained prior to generating the estimated time to ovulation.

In an embodiment, machine learning uses supervised learning.

In an embodiment, generating the cycle phase probabilities comprises the processor using the machine learning model based on a neural network. The machine learning model comprises the neural network.

In an embodiment, transmitting the time interval for using contraception comprises the processor generating the message such that the message comprises an indication of whether the current day is within or outside the time interval for using contraception, and/or a probability of conception on the current day.

In an embodiment, receiving the physiological data further comprises the processor receiving from the female an entry which indicates the time of the start of menstruation.

In an embodiment, generating the cycle phase probabilities comprises the processor using the neural network with one or more of: a one-dimensional convolutional layer (1 D CNN) and a recurrent layer.

In an embodiment, generating the cycle phase probabilities comprises the processor using the neural network with one or more one-dimensional convolutional layers configured to determine short-term features of an input data sequence of the physiological data, by generating a current output $h_i$ using a one-dimensional convolution of kernel size three, the one-dimensional convolution being modified to be solely retrospective by having as inputs the input data terms $x_{i-2}$, $x_{i-1}$, and $x_i$ of the input data sequence, where the index denotes time.

In addition to the computer-implemented method for determining for a female a time interval for using contraception, the present invention also relates to a computer system for determining for a female a time interval for using contraception, the computer system comprising a processor configured to receive, from a sensor system of a wearable device of the female, physiological data of the female. The processor is configured to generate cycle phase probabilities of the female being in one or more cycle phases of her menstrual cycle on a given day, by use of a machine learning model and the physiological data. For example, the processor is configured to generate cycle phase probabilities of the female being in one particular cycle phase, i.e. being either in the early follicular phase, the fertile window, or the luteal phase. The cycle phases comprise an early follicular phase, a fertile window, and/or a luteal phase. The processor is configured to determine the time interval for using contraception using the physiological data, the cycle phase probabilities, and pre-determined cycle phase probability thresholds. The processor is configured to generate a message for the female comprising the time interval for using contraception.

In an embodiment, the processor is configured to receive one or more of: skin temperature data, breathing rate data, resting pulse rate data, heart rate variability data, perfusion data, and pulse wave analysis data.

In an embodiment, the processor is further configured to record the physiological data for one or more menstrual cycles in a physiological data log, and generate the cycle phase probabilities by use of the machine learning model, the physiological data, and the physiological data log.

In an embodiment, the processor is further configured to train the machine learning model to generate the cycle phase probabilities using machine learning and a training dataset of physiological training data of a large group of females. The person skilled in the art understands that training the machine learning model can be performed on a separate processor and/or at a time separate from generating the estimated time to ovulation. In particular, the machine learning model can be trained prior to generating the estimated time to ovulation.

In an embodiment, machine learning uses supervised learning.

In an embodiment, the processor is further configured to generate the message for the female such that the message comprises an indication of whether the current day is within or outside the time interval for using contraception, and/or a probability of conception on the current day.

In an embodiment, the processor is further configured to receive from the female an entry which indicates the time of the start of menstruation.

In an embodiment, the processor is configured to use the machine learning model based on a neural network. The machine learning model comprises the neural network.

In an embodiment, the processor is configured to use the machine learning model based on one or more specific models and/or methods. The specific models and/or methods include one of more of the following: a random forest, multiple regressions, logistic multiple regressions, a support vector machine (SVM), and hidden Markov models. The person skilled in the art understands that other types of machine learning model and/or other specific methods can also be used.

In an embodiment, the processor is configured to use the neural network with one or more of: a one-dimensional convolutional layer and a recurrent layer.

In an embodiment, the processor is configured to use the neural network with one or more one-dimensional convolutional layers configured to determine short-term features of an input data sequence of the physiological data, by generating a current output $h_i$ using a one-dimensional convolution of kernel size three, wherein the one-dimensional convolution is modified to be solely retrospective by having as inputs the input data terms $x_{i-2}$, $x_{i-1}$, and $x_i$ of the input data sequence, where the index i denotes time.

In addition to the computer-implemented method and the computer system for determining for a female a time interval for using contraception, the present invention also relates to a computer program product comprising a non-transitory computer-readable medium having stored thereon computer program code configured to control a processor of a computer. The computer program code is configured such that the computer performs the steps: receiving from a sensor system of a wearable device of a female, physiological data of the female; generating cycle phase probabilities of the female being in one or more cycle phases of her menstrual cycle on a given day, by use of a machine learning model and the physiological data, the cycle phases comprising an early follicular phase, a fertile window, and/or a luteal phase; determining a time interval for using contraception using the physiological data, the cycle phase probabilities, and pre-determined cycle phase probability thresholds; and generating a message for the female comprising the time interval for using contraception.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
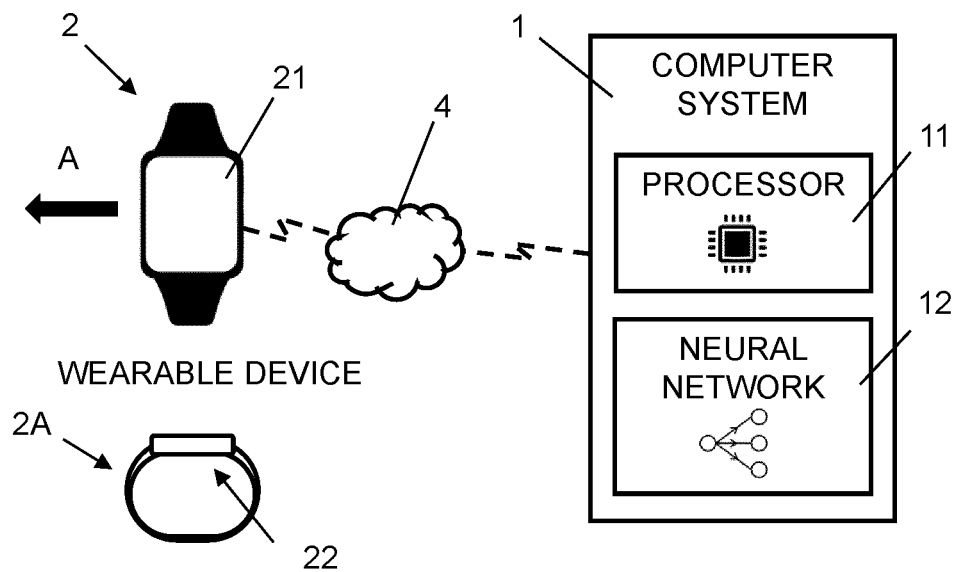
FIG. 1: shows a block diagram illustrating schematically a computer system for determining for a female a time interval for using contraception, and a wearable device.

In FIG. 1, reference numeral 1 refers to a computer system comprising one or more computers with one or more processors 11. The computer system 1 can further include various components, such as a data storage system, a communication interface, and/or a user interface. The components of the computer system 1 can be connected to each other via a data connection mechanism, such that they can transmit and/or receive data.

The term data connection mechanism means a mechanism that facilitates data communication between two components, devices, systems, or other entities. The data connection mechanism can be wired, such as a cable or system bus. The data connection mechanism can also include wireless communication. The data connection mechanism can also include communication via networks, such as local area networks, mobile radio networks, and/or the Internet 4. The Internet 4 includes, depending on the implementation, intermediary networks.

The processor 11 may comprise a system on a chip (SoC), a central processing unit (CPU), and/or other more specific processing units such as a graphical processing unit (GPU), application specific integrated circuits (ASICs), reprogrammable processing units such as field programmable gate arrays (FPGAs), as well as processing units specifically configured to accelerating certain applications, such as AI (Artificial Intelligence) Accelerators for accelerating neural network and/or machine learning processes.

The data storage system comprises one or more volatile and or non-volatile storage components. The storage components may be removable and/or non-removable, and can also be integrated, in whole or in part with the processor 11. Examples of storage components include RAM (Random Access Memory), flash memory, hard disks, data memory, and/or other data stores. The data storage system comprises a non-transitory computer-readable medium having stored thereon computer program code configured to control a processor 11, such that the computer system 1 performs one or more steps and/or functions as described herein. Depending on the embodiment, the computer program code is compiled or non-compiled program logic and/or machine code. As such, the computer system 1 is configured to perform one or more steps and/or functions. The computer program code defines and/or is part of a discrete software application. One skilled in the art will understand, that the computer program code can also be distributed across a plurality of software applications. In an embodiment, the computer program code further provides interfaces, such as APIs, such that functionality and/or data of the computer system 1 can be accessed remotely, such as via a client application or via a web browser.

In an embodiment, the computer system 1 is implemented as a server computer system at a location remote from a female, e.g. in a cloud-based computer system. The neural network 12 is a software module which takes as an input physiological data 13 and outputs cycle phase probabilities 14, as explained in more detail below.

A wearable device 2 is worn and/or carried by the female. Reference numeral 2A refers to a cross-sectional view of the wearable device 2 along central axis A. The wearable device 2 comprises a sensor system 22 and a communications module. The sensor system 22 is configured to measure physiological data 13 of the female. The sensor system 22 is preferably entirely integrated into the wearable device 2, however in some embodiments one or more sensor modules of the sensor system 22 may be separate from the wearable device 2 and configured to exchange data with the wearable device 2 in a wired manner, e.g. over a USB (Universal Serial Bus) connection, or wirelessly, e.g. over WLAN (Wireless Local Area Network), Bluetooth, Bluetooth LE (Low Energy), ANT+, mobile radio, etc. For example, the sensor system 22 comprises a first sensor module arranged in the wearable device 2 which is worn as a bracelet on the wrist of the female, along with a second sensor module arranged in a chest-strap worn across the torso of the female. Preferably, the sensor system 22 is in contact with the skin of the female, for example at the wrist, forearm, ankle, fingertip, torso, earlobe, and/or forehead. In an embodiment where the sensor system 22 is integrated directly into the wearable device 2, the wearable device 2 is implemented as appropriate for the part of the body where the sensor system 22 is located. For example, if the sensor system 22 is located at the wrist of the female, the wearable device 2 is implemented as a device worn on the wrist in the form of a bracelet, cuff, or watch, for example the wearable device 2 can be implemented as a health tracker, fitness tracker, or a smart watch. Alternatively, the sensor system 22 is located at the forehead, in which case the wearable device 2 can be implemented as a headband, hat, helmet, etc.

The sensor system 22 is configured to measure physiological data 13, comprising a resting pulse rate, a heart rate variability features, blood perfusion, skin temperature, a breathing rate, and/or pulse wave analysis (PWA) data. The physiological data 13 comprises directly measured data and/or data generated by the wearable device 2 from directly measured data. For example, the physiological data 13 comprises both a directly measured time series of physiological signals of the female, as well as data generated therefrom by the wearable device 2, such as maxima, minima, and/or median values.

In a preferred embodiment, the sensor system 22 is configured to acquire a plethysmogram of the female, most preferably a photoplethysmogram (PPG). The physiological data 13 comprises the plethysmogram and/or data generated therefrom. The plethysmograph is used to detect blood volume variations in the microvascular bed of tissue of the female close to the sensor system 22. The sensor system 22 comprises a light source, for example an infrared light or a green light, and one or more photodetectors.

Light shone onto the tissue by the light source penetrates the tissue and is scattered in the tissue such that the one or more photodetectors detect the transmitted and/or reflected light. From the plethysmograph, blood volume changes can be calculated from the amount of detected light.

In a preferred embodiment, an acquired PPG signal from a PPG is transmitted from the sensor system 22 to the wearable device 2. The PPG signal may be transmitted over a wired connection, in the case that the sensor system 22 is integrated in the wearable device 2 or connected via a signal line to the wearable device 2, or it may be transmitted wirelessly, in case the sensor system 22 is arranged in a separate component to the wearable device 2, for example if the wearable device 2 is implemented as a bracelet and the sensor system 22 is arranged on a fingertip of the female.

In an embodiment, the wearable device 2 further comprises hardware modules configured to determine a bioelectrical impedance, a thermometer for measuring the temperature of the female, a current time, an acceleration of the wearable device 2, an orientation of the wearable device, a location of the wearable device, and/or ambient conditions, which ambient conditions comprise an air temperature, pressure and/or humidity. The additional determining of the acceleration of the wearable device 2 allows the wearable device 2 to determine movement data of the female, allowing the PPG signal to be processed and interpreted with improved accuracy, as PPG signals can be very susceptible to motion artefacts caused by movement, such as movement of the sensor system 22 by movement of the wrist and/or body of the female during acquiring of the PPG signal. Further, determining the bodily motion of the female allows the wearable device 2 to determine whether the female is motionless or not. This allows the wearable device 2 to determine when measurement data should be acquired and improves the interpretation of the data.

For example, resting heart rate is preferably acquired after the female has been at rest for a given period of time, and this can be determined by combining a time of day with movement data. Similarly, a breathing rate is preferably determined after the female has been at rest for a given period of time. In a preferred embodiment, the wearable device 2 measures physiological data 13 at night. The wearable device 2 comprises a communication interface for wired and/or wireless communication. Wired communication may take place over a Thunderbolt or USB interface, for example. Wireless communication may take place using Bluetooth, Bluetooth LE, WLAN, ANT+, and/or mobile radio, for example.

In an embodiment, the wearable device 2 further comprises an input module which enables the female to enter additional data into the wearable device 2. For example, the input module comprises a touch interface and/or hardware buttons, such as push-buttons or rotary switches, which input module enables the female to enter additional data into the wearable device 2. The female is enabled to enter additional data such as the specific start of menstruation, the end of menstruation, as well as other data which relate to her menstrual cycle. This additional data is recorded in the wearable device 2 and included as part of the physiological data 13.

In an embodiment, the wearable device 2 further comprises a display module 21. The display module 21 may comprise an electronic display, e.g. an LCD (Liquid Crystal Display), OLED (Organic Light Emitting Diodes), or E Ink display, as well as other hardware elements for visually conveying information the female, such as LEDs in one or more colors. The touch interface can be integrated into the display module 21.

In an embodiment, the wearable device 2 and the computer system 1 are integrated into a single device, for example a smart-watch.

Figure 2:
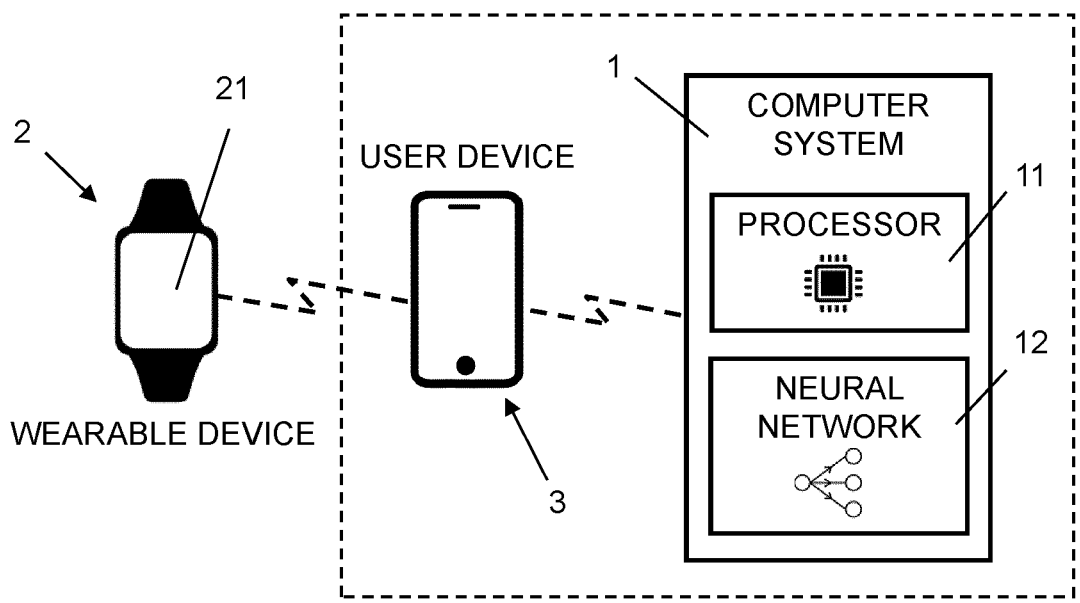
FIG. 2: shows a block diagram illustrating schematically a computer system for determining for a female a time interval for using contraception, a wearable device, and a user device.

FIG. 2 shows a block diagram illustrating schematically an embodiment of the invention wherein a user device 3 of the female acts as an intermediary between the wearable device 2 and the computer system 1. The user device 3 is an electronic computing device. For example, the user device 3 is fixedly installed, such as a personal computer, or portable, such as a laptop, tablet, smart phone, or smart watch. The wearable device 2 is connected to the user device 3 using a connection mechanism as described above, for example wired via a USB connection, or wirelessly via Bluetooth. The user device 3 connects to the computer system 1 using a connection mechanism as described above, for example via a mobile radio network, the Internet 4, etc. The user device 3 acts as an intermediary such that the wearable device 2 is enabled to transmit information to the computer system 1 using the user device 3. Similarly, the wearable device 2 receives information from the computer system 1 via the user device 3.

In an embodiment, the user device 3 and the computer system 1 are implemented in a single electronic computing device as described above.

Figure 3:
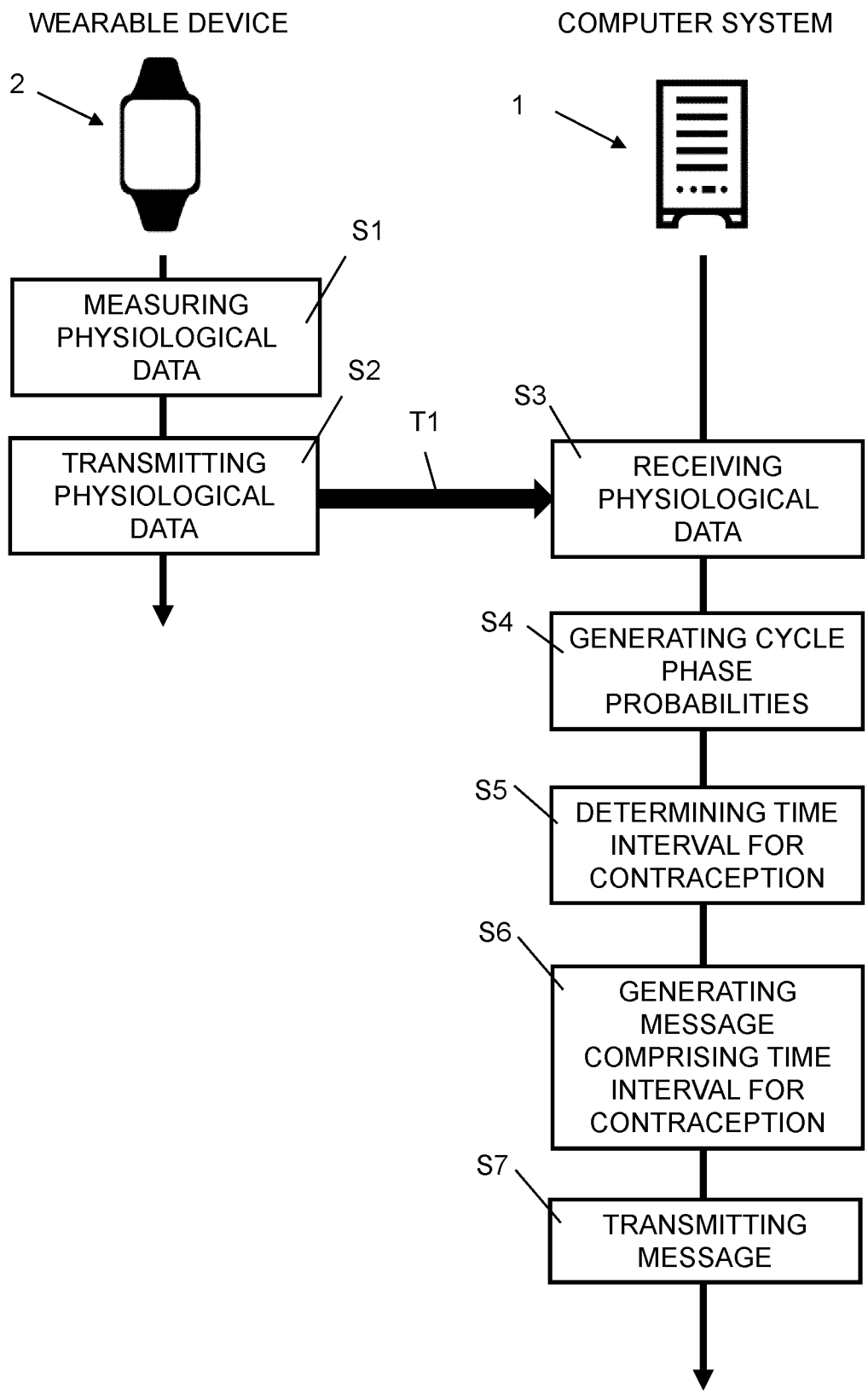
FIG. 3: shows a flow diagram illustrating a sequence of steps for determining for a female a time interval for using contraception.

FIG. 3 shows a flow diagram schematically illustrating a sequence of steps for carrying out the invention.

In step S1, the wearable device 2 measures physiological data 13 of the female. The physiological data 13 is processed by the wearable device 2 and/or complemented by is additional data entered by the female.

In step S2, the wearable device 2 transmits the physiological data 13, in a transmission T1, from the wearable device 2 to the computer system 1. In particular, the communications module of the wearable device 2 transmits the physiological data 13, via a wired and/or wireless transmission T1, to the processor 11 of the computer system 1, which computer system 1 receives the transmission T1 in step S2. In particular, the processor 11 of the computer system 1 receives the transmission T1 in step S2. Along with the physiological data 13, the wearable device 2 transmits an identifier associated with the female, such as a device identifier and/or a personal identifier.

In an embodiment, the wearable device 2 is implemented as a wearable device worn on the wrist, and the computer system 1 is implemented as a cloud-based computer system 1. Depending on the embodiment and/or configuration, the transmission T1 comprises a wireless transmission to an intermediary device, such as a wireless router or the user device 3 of the female along with a subsequent transmission over the Internet 4 to the computer system 1, and/or the transmission T1 takes place over a mobile radio network. In this embodiment, receiving the transmitted physiological data 13 in a cloud-based computer system 1 has the benefit of allowing the collection of physiological data 13 of large number of females, such that improvements to the functionality of the invention can be undertaken using data analytics, in particular in improving the accuracy of the determined time window of using contraception, for example using a barrier method.

In an embodiment where the computer system 1 is implemented in the user device 3 of the female, the transmission T1 is a direct wireless transmission T1 from the wearable device 2 to the computer system 1, e.g. a Bluetooth transmission; alternately, the transmission is T1 is an indirect transmission, e.g. via WLAN or a mobile radio network.

In an embodiment where the computer system 1 is integrated into the wearable device 2, the transmission T1 is a wired transmission T1 from the sensor system 22 to the processor 11.

The physiological data 13 transmitted in transmission T1 comprises pulse wave analysis (PWA) data derived from the PPG signal. This PWA data derived from the PPG signal is generated in the wearable device 2 by processing the PPG signal, such that only particular PWA data generated using the PPG signal is transmitted from the wearable device 2 to the computer system 1. The PWA data generated using the PPG signal comprises one or more of the following: a systolic amplitude, a pulse area, a peak to peak interval indicating heart rate, a peak to peak variability indicating heart rate variability (HRV), first-order features (features derived from the first derivative of the PPG signal), and second-order features (features derived from the second derivative of the PPG signal). The second-order features comprise critical points in the second derivative of the PPG signal located at local maxima, minima, and/or inflection points of the second derivative of the PPG signal. The relationships and ratios between the critical points make it possible to determine a number of health-related parameters and factors.

In another embodiment, the physiological data 13 transmitted in transmission T1 comprises the entire measured PPG signal. This enables the computer system 1 to perform data processing on the entire measured PPG signal. This has the advantage of requiring less data processing to occur in the wearable device 2. It also has the advantage of allowing the computationally more powerful computer system 1 to perform the data processing, allowing for a more detailed analysis and comparisons to be made between a large group of females. This has the disadvantage of requiring more data to be transmitted, in the transmission T1, from the wearable device 2 to the computer system 1. Further, it can require more memory in the wearable device 2.

In step S3, the computer system 1 receives the physiological data 13. In an embodiment, the computer system 1 records the physiological data 13 over a period of several days, preferably over one or more menstrual cycles, in a physiological data log.

In step S4, the processor 11 of the computer system 1 generates cycle phase probabilities 14. Cycle phase probabilities 14 comprise a sequence of sets of probabilities, each term of the sequence corresponding to a particular interval of time, and each member of the set corresponding to a probability that the female is in one of a set of cycle phases of the menstrual cycle. The set comprises an early follicular phase probability, a fertile window probability, and/or a luteal phase probability. The interval of time is preferably one day. The sequence is therefore preferably a sequence where each sequence term corresponds to a particular day and comprises a set of three cycle phase probabilities 14. The cycle phase probabilities 14 are generated in the processor 11 using the neural network 12 and the physiological data 13. Specifically, cycle phase probabilities 14 are generated in the processor 11 using physiological data 13 acquired on the current day, as well as physiological data 13 acquired on one or more past days, preferably a sequence of a number of preceding days. The physiological data 13 is preferably acquired on a given day at night, while the female is asleep. In addition to a current time, in an example physiological data 13 is acquired based on movement data of the female acquired through an accelerometer. This results in more reliable physiological data 13 as the female is at rest during the acquisition and therefore additional context, e.g. if the female is currently doing sport, is not required to interpret the physiological data 13. Using physiological data 13 from a larger number of past days, results in more reliable generation of cycle phase probabilities 14. In particular, for each of one or more cycle phases a cycle phase probability 14 is generated, which cycle phase probability 14 is a probability of the female being in a particular cycle phase of the one or more cycle phases of her menstrual cycle on a given day.

In an embodiment, the computer system 1 uses the physiological data log to generate cycle statistics. The cycle statistics comprise the lengths of previous menstrual cycles of the female, the number of days since the last ovulation, and/or statistical values. The statistical values comprise the minimum, the median, and/or the maximum cycle length of previous menstrual cycles of the female. In addition to the physiological data 13, the cycle statistics can be used to generate the cycle phase probabilities 14.

The generated cycle phase probabilities 14 on a given day could be, for example, 70% probability of early follicular phase, 30% probability of fertile window, and 0% probability of luteal phase. In another example, the generated cycle phase probabilities 14 could be 15% probability early follicular phase, 80% probability fertile window, and 5% probability luteal phase. Cycle phase probabilities 14 can be generated for the current day, using physiological data 13 acquired on days up to and including the current day. Cycle phase probabilities 14 can also be generated for days in the past.

In an embodiment, cycle phase probabilities 14 are generated for days in the future, using physiological data 13 comprising only data collected in the past.

In step S5, the processor 11 of the computer system 1 determines the time interval for using contraception. The processor 11 uses the generated cycle phase probabilities 14, along with pre-determined cycle phase probability thresholds, to determine the time interval for using contraception. The time interval for using contraception is a span of time during the menstrual cycle, for example a set of days, within which the female is considered is to be fertile and within which unprotected intercourse may lead to conception. The pre-determined cycle phase probability thresholds comprise an opening threshold and a closing threshold, which mark the first unsafe day and the first safe day, respectively. An unsafe day is a day which falls inside the time interval for using contraception, as the likelihood of conception following unprotected intercourse is high. A safe day is a day on which the likelihood of conception is low and therefore falls outside the time interval for using contraception.

In an embodiment, the cycle phase probability threshold is a threshold function. The threshold function is configured such that the processor 11 of the computer system 1 determines, using as input the cycle phase probabilities 14, the time interval for using contraception.

In an embodiment, the threshold function is configured such that the processor 11 determines whether the current day lies within or outside the time interval for using contraception. The threshold function can be configured such that the processor 11 determines the likelihood of a pregnancy occurring on a given day.

In an embodiment, the cycle phase probability thresholds comprise two functions, an opening threshold function and a closing threshold function. The opening threshold function is configured such that the processor 11 determines, using the cycle phase probabilities 14, a first point in time when the time interval for using contraception opens.

In particular, the time interval for using contraception opens when the early follicular phase probability falls below a certain probability value. The closing threshold function is configured such that the processor 11 determines, using the cycle phase probabilities 14, a second point in time when the time interval for using contraception closes. In particular, the time interval for using contraception closes when the luteal phase probability rises above a certain probability value. The probability values of the early follicular phase probability and the luteal phase probability, which are used in the opening threshold function and the closing threshold function, respectively, are pre-determined.

In an embodiment, the values of the early follicular phase probability and the luteal phase probability are values specific to the female.

In an embodiment, the opening and closing threshold functions are configured such that the processor 11 determines whether the current day lies within or outside the time interval for using contraception. The opening and closing threshold functions are configured such as to make it possible for the processor 11 to determine the likelihood of conception on a given day.

In step S6, the processor 11 of the computer system 1 generates a message for the female comprising the time interval for using contraception. The message can further comprise an identifier associated with the female and/or a device identifier or communication address associated with the wearable device 2 of the female.

In step S7, using the communication module of the computer system 1, the processor 11 of the computer system 1 transmits the message from the computer system 1 to the wearable device 2. The wearable device 2 indicates to the female the time interval for using contraception.

In an embodiment, the wearable device 2 indicates whether the current day is within the time interval for using contraception, and/or the likelihood of conception on the current day.

In an embodiment, the processor 11 of the computer system 1 transmits the message from the computer system 1 to the user device 3 of the female. The user device 3 receives the message and indicates to the female, using a display of the user device 3, the time interval for using contraception. The user device 3 can further indicate whether the current day lies within or outside the time interval for using contraception and/or the likelihood of conception on the current day. In one example where the user device 3 is implemented as a smart phone, the smart phone comprises an application which receives the message from the computer system 1. In another example, where the user device 3 is implemented as a personal computer, the personal computer receives the message via a web-browser, for example.

Displaying the time interval for using contraception comprises displaying one or more days and indicating whether the one or more days are in the time interval for using contraception or not, for example. In particular, displaying the time interval for using contraception comprises displaying whether the current day is in the time interval for using contraception.

The female, based on whether the current day lies within the time interval for using contraception or not, uses a contraceptive method for reducing the likelihood of conception. For example, the female uses a barrier method. In another example, the female abstains from intercourse during the time interval for using contraception.

Figure 4:
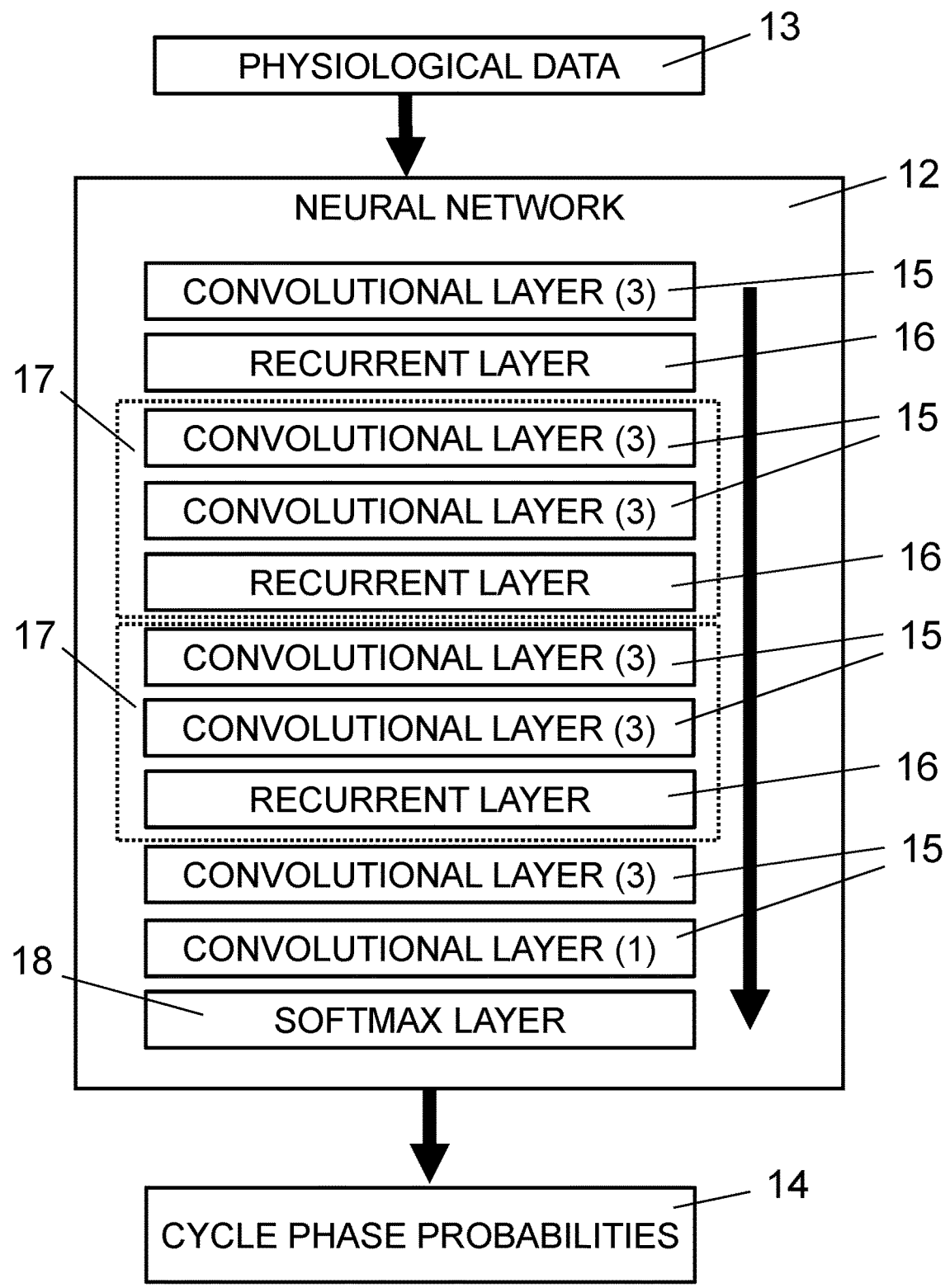
FIG. 4: shows a block diagram illustrating schematically a neural network for generating cycle phase probabilities using physiological data.

FIG. 4 illustrates schematically the neural network 12. Physiological data 13 is input into the neural network 12, which is processed by the neural network 12 to generate cycle phases probabilities 14. In particular, the neural network 12 is configured such that the processor 11 of the computer system 1, using physiological data 1 3, generates cycle phase probabilities 14. The neural network 12 is a neural network which implements a function which can be decomposed into other functions. The neural network 12 comprises a set of parameters. The neural network 12 can be represented as a sequence of layers, which layers may be grouped into sub-networks. Each layer comprises a set of nodes, each node having adjustable parameters including at least one or more weight parameters and a bias parameter. The sequence of layers comprises an input layer, into which physiological data 13 is passed, a succession of hidden layers, and an output layer, which outputs the cycle phase probabilities 14. The hidden layers of the neural network 12 comprise one or more of the following types: a one-dimensional convolutional layer 1 5, a recurrent layer 1 6, and a softmax layer 18.

In an embodiment, the layers are grouped into layer groups 17 of one or more one-dimensional convolutional layers 15 and recurrent layers 16. The neural network 12 comprises a first one-dimensional convolutional layer 15 followed by a recurrent layer 16. Then two layer groups 17 follow, each comprised of two convolutional layers 15 followed by a recurrent layer. Two convolutional layers 15 follow the layer groups 17, and then a final softmax layer 18 is used to normalize the data from previous layers to generate cycle phase probabilities 14.

The neural network 12 is initially in an untrained state. The neural network 12 is then trained in a training phase, which takes place before the neural network 12 is used to determine the time interval for using contraception based on physiological data 13 of the female. The neural network 12 is trained to generate the cycle phase probabilities 14 using machine learning and a training dataset of physiological training data of a large group of females. The neural network 12 is trained using supervised learning, in which labelled physiological data is used to optimize the parameters of the neural network 12.

In particular, the physiological training data comprises labelled physiological data of the menstrual cycle from a large group of females labelled with an ovulation day. Labelling the labelled physiological data further comprises using the day of ovulation to generate an assignment of each day of the menstrual cycle to one of the cycle phases. In particular, the five days up to and including the day of ovulation are assigned to the fertile window. Days preceding the fertile window are assigned to the early follicular phase, and days following the date of ovulation are assigned to the luteal phase. The labelled physiological data is used during training of the neural network 12.

The neural network 12 is trained by generating cycle phase probabilities 14 for a given day using the labelled physiological data. To improve the accuracy of the neural network 12, the generated cycle phase probabilities 14 are compared to the actual cycle phase as specified in the labelled physiological data. In particular, a loss function is used. For example, the loss function comprises a cross entropy term, as is commonly used in the art of neural networks for classification. The goal of training the neural network 12 is to iteratively minimize the loss function using a first order optimization technique and back-propagation. Successive training iterations result in a neural network 12 with generated estimates lying closer and closer to the actual cycle phase as specified in the labelled physiological data, as reflected mathematically by a smaller cross entropy term of the loss function.

The neural network 12 is stored, by the processor 11, in the data storage system of the computer system 1, for use in determining the time interval for using contraception of the female.

The cycle phase probability threshold is optimized such that the size of the fertile window generated using the trained neural network 12 is minimized. The results of this is optimization are stored as pre-determined cycle phase probability thresholds, by the processor 11, in the data storage system of the computer system 1.

In an embodiment, the cycle phase probability thresholds comprise an opening threshold and a closing threshold. These two cycle phase probability thresholds are optimized using a two dimensional receiver operating characteristic (ROC) curve, wherein the first dimension corresponds to the opening threshold and the second dimension corresponds to the closing threshold. The ROC curve is used to determine for each possible combination of opening threshold and closing threshold the number of days within the fertile window. The combination of thresholds which result in the fertile window of the smallest number of days, provided a determined fertility and/or probability of conception is not too high, is selected. The results of the optimization are stored as pre-determined cycle phase probability thresholds, by the processor 11, in the data storage system for use with the neural network 12.

The training of the neural network 12 and the optimizing of the cycle phase probability thresholds as described above take place using the processor 11 of the computer system 1. However, in an embodiment, this takes place on a separate computer system 1, such as a remote cloud-computing server, after which the neural network 12 is transmitted to the processor 11 of the computer system 1. In an embodiment, the neural network 12 is further transmitted to the wearable device 2 or the user device 3 of the female.

Figure 5:
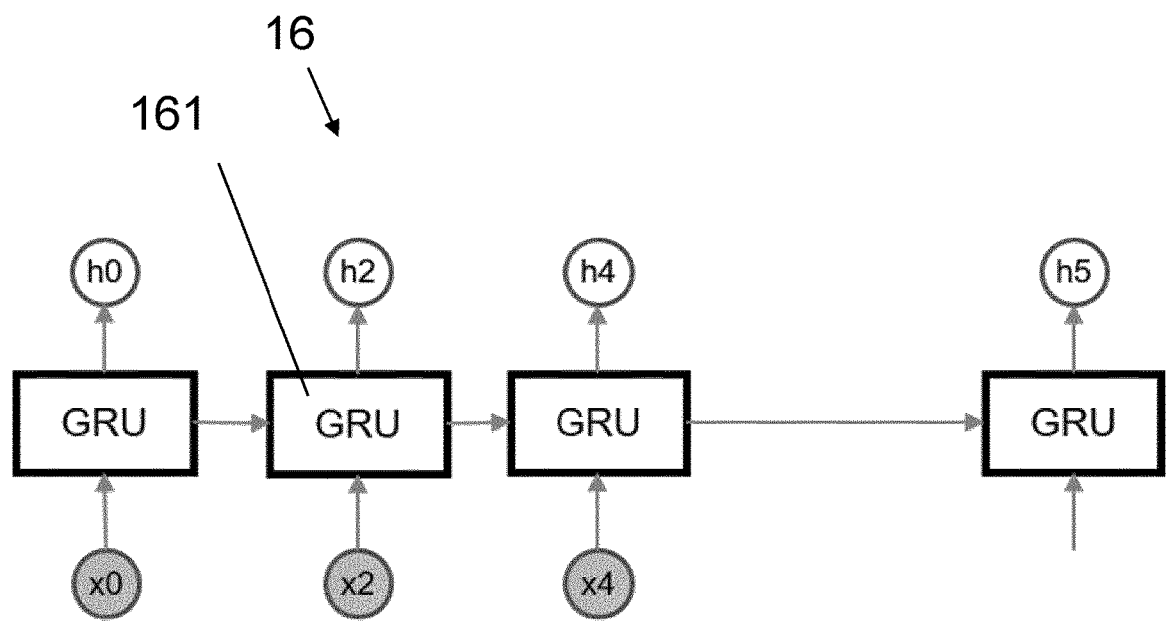
FIG. 5: shows a block diagram illustrating schematically gated recurrent units.

FIG. 5 illustrates schematically a type of recurrent layer 16 known as a gated recurrent unit (GRU) 161. The GRU 161 is one type of recurrent layer 16 among other types such as long short-term memory (LSTM) units. Both GRUs 161 and LSTM units have the objective of learning long-term features present in sequential data while mitigating the vanishing/exploding gradient problem. They further have the objective of being capable of retaining information from terms of the sequential data over longer distances (i.e. for more than a few terms), for example where there are correlated terms in the sequence, which terms have a large gap of non-correlated terms between them. Both LSTM and GRUs 161 have several hidden parameters associated with gate functions which gate functions are configured to retain and/or discard information from previous states. GRUs 161 were developed later than LSTM units and are considered as simpler and less complex than LSTM units. In many applications GRUs 161 are not as capable as LSTM units, however in the present invention tests have shown that they are more advantageous than LSTM units, in particular, in that their lower complexity results in lower memory and computational requirements for the computer system 1, both for the training of the neural network 12 and for when the trained neural network 12 is deployed and used. This is particularly advantageous if the neural network 12 is used in the wearable device 2 or the user device 3 of the female.

GRUs 161 comprise an update gate and a reset gate, wherein the update gate is configured to determine how much of a previous state output is to contribute in determining a current state output, and the reset gate is configured to determine how much of the previous state output is to be discarded in determining the current state output. The GRUs 161 take an input sequence which was output from a previous layer of the neural network 12, in particular the output from a one-dimensional convolutional layer 15. The GRU 161 generates an output for each term of the input sequence by using the term of the input sequence, the previously generated output generated using the previous term of the input sequence, and the parameters of the GRU 161.

Figure 6:
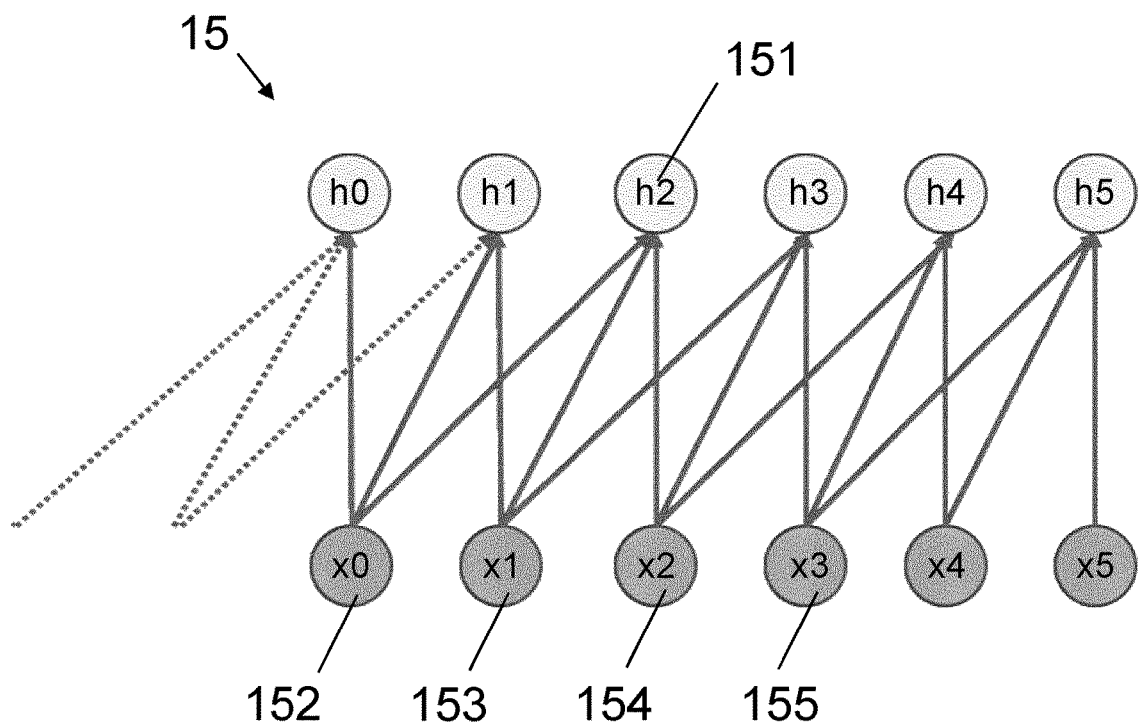
FIG. 6: shows a block diagram illustrating schematically a one-dimensional convolutional layer.

FIG. 6 illustrates schematically a one-dimensional convolutional layer 15 of the neural network 12. The physiological data 13 comprises physiological data 13 from one or more is past days arranged in a sequence, and the one-dimensional convolutional layers 15 are configured to determine short-term features of the physiological data 13 in the sequence. The one-dimensional convolutional layers 15 comprise a plurality of kernels, each kernel being configured to learn a single feature of the physiological data 13. The kernels have a kernel size, which determines how many terms of the sequence are used by the one-dimensional convolutional layer 15 at the same time for generating an output. A larger kernel size, i.e. larger than five, will use a sequence of more days and therefore learn long-term features. A smaller kernel size, i.e. smaller than five, will use a sequence of fewer days and therefore learn short-term features. The processor 11 requires less processing power to generate the output from a one-dimensional convolution layer 15 with a small kernel size than a large kernel size.

Tests have shown that kernel of sizes of two to seven days, preferably three to five, most preferably three days, show good performance. In particular, tests have shown that a kernel size of three days can reliably determine short-term features on the time-scales relevant to how the physiological data 13 varies during the menstrual cycle. Additionally, a kernel size of three reduces the computational costs.

Typically, in the art of neural networks, one-dimensional convolutional layers 15 are configured such that short-term features of the sequence are generated by considering both sequence terms before and after a given day, i.e. the kernel is arranged symmetrically around the given day and therefore the one-dimensional convolutional layer 15 is both preemptive and retrospective. However, the one-dimensional convolutional layers 15 according to the invention are configured such that they are solely retrospective, as this relates to how the data is acquired and because the invention relates to the prognostication of the time interval for using contraception. For example, short-term features of the physiological data 13 can relate to a physiological parameter comprised in the physiological data 13 increasing over a given length of time, decreasing, reaching a maximum value, reaching a minimum value, etc.

In an embodiment, the one-dimensional convolutional layer 15 is configured to determine short-term features of an input data sequence of the physiological data 13 by generating a current output $h_i$ 151 using a one-dimensional convolution of kernel size three, the one-dimensional convolution being modified to be solely retrospective by having as inputs the input data terms $x_{i-2}$ 152, $x_{i-1}$ 153, and $x_i$ 154 of the input data sequence, where the index i denotes time. Typically, a one-dimensional convolutional layer 15 would be arranged symmetrically around the index i, such that instead of the term $x_{i-2}$ being used, the term $x_{i+1}$ 155 would be used. In this embodiment, the current output $h_i$ is the output of the one-dimensional convolutional layer 15 of a day of index i. For example, if the first one-dimensional convolutional layer 15 of the neural network 12 is considered, and the current day is given the index c, then the output of the one-dimensional convolutional layer 15 would use as inputs the input data terms $x_{c-2}$, and $x_c$, corresponding to the physiological data 13 of the day before yesterday, yesterday, and today, respectively.

In an embodiment, the one-dimensional convolutional layer 15 is configured to determine short-term features of an input data sequence of the physiological data 13 by generating a current output $h_i$ 151 using a one-dimensional convolution of kernel size five, the one-dimensional convolution being modified to be solely retrospective by having as inputs the input data terms $x_{i-4}$, $x_{i-3}$ $x_{i-2}$, $x_{i-1}$, and $x_i$ of the input data sequence, where the index denotes time. The person skilled in the art will know that other kernel sizes can be implemented as required.

Figure 7:
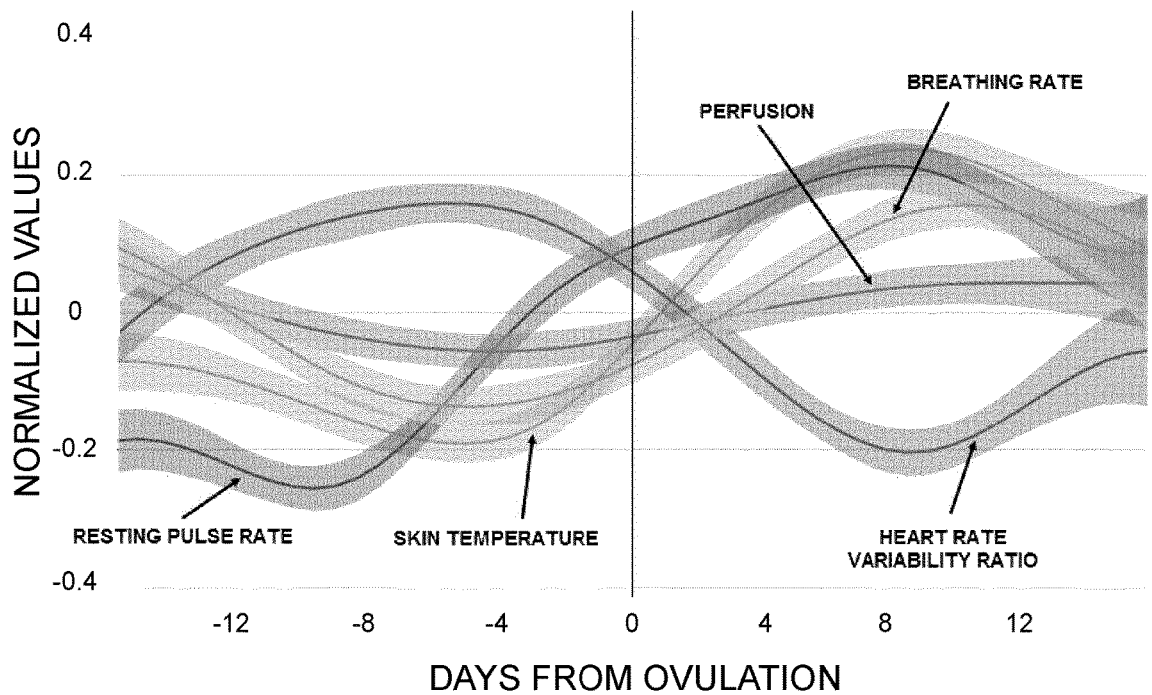
FIG. 7: shows a time series plot showing how various physiological parameters of a female change during the menstrual cycle.

FIG. 7 shows a time series plot illustrating how various physiological parameters of a female change during the menstrual cycle, the physiological parameters being comprised in the physiological data 13. In particular, it shows how normalized values of perfusion, breathing rate, resting pulse rate, skin temperature, and heart rate variability ratio depend on the number of days from ovulation. Analytically determining how these physiological parameters are related to the day of ovulation and therefore how they relate to the fertile window of the female is very complex. However, using the neural network 12 with the particular architecture as described above, a physiological training dataset comprising physiological training data from a very large dataset of females, and an appropriate training method (i.e. defining an appropriate loss function), parameters of the neural network 12 can be determined such that the neural network 12 can reliably determine the time interval of using contraception using the physiological data 13.

Figure 8:
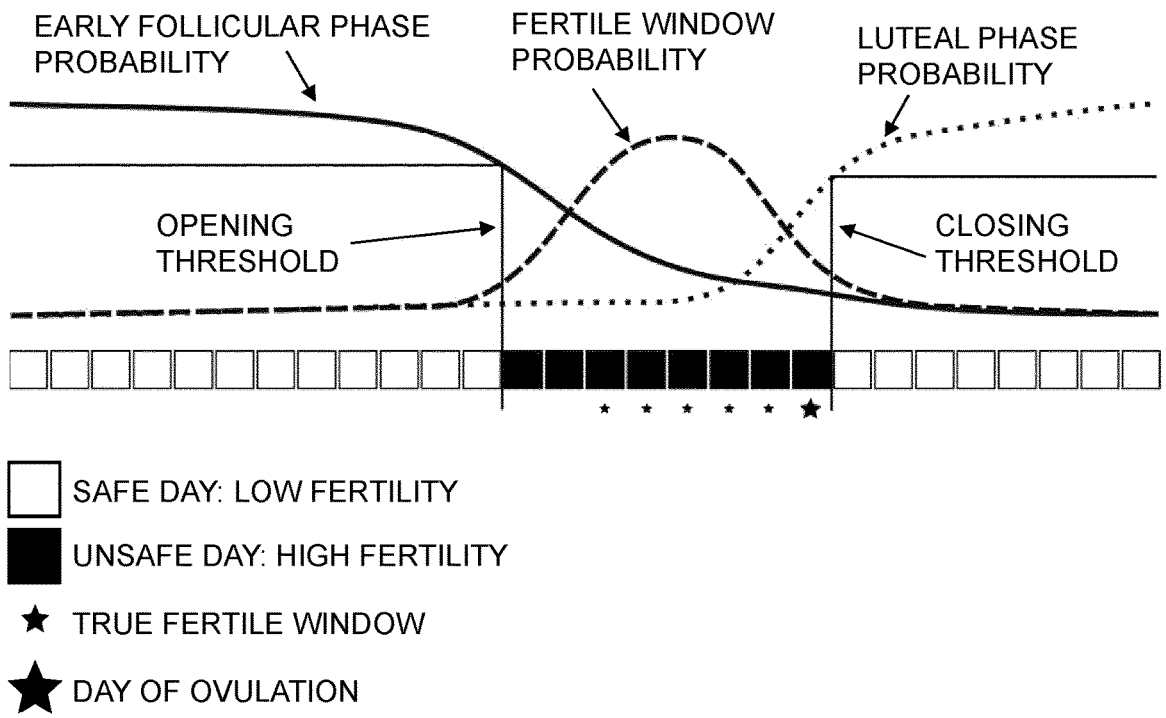
FIG. 8: shows a time series illustration of how cycle phase probabilities change during the menstrual cycle, how opening and closing thresholds are used to define, using the cycle phase probabilities, safe days and unsafe days, and how the day of ovulation relates to the safe and unsafe days.

FIG. 8 shows a time series illustration of how the generated cycle phase probabilities 14 change during the menstrual cycle and how these cycle phase probabilities 14 are used along with the opening and closing thresholds to define the time interval for using contraception, which is comprised of the unsafe days (as indicated by black squares in FIG. 8).

The day of ovulation is marked, and in this Figure the true fertile window is given as the six days up to and including the day of ovulation. The unsafe days (as indicated by black squares in FIG. 8) however are determined with an additional margin of safety of two days such that the unsafe days are the eight days up to and including the day of ovulation. In an embodiment, an additional margin of safety is included such that one or two days after ovulation are also considered unsafe days and therefore lie within the time interval for using contraception.

It can be seen that the cycle phase probabilities vary throughout the menstrual cycle, beginning with a high early follicular phase probability, which decreases towards the day of ovulation. The fertile window probability is shaped approximately like a bell curve with a peak occurring a few days before the day of ovulation. The luteal phase probability rises sharply just before the day of ovulation.

It can be seen that the opening threshold defines, using the early follicular phase probability, the beginning of the time of using contraception, i.e. the beginning of the fertile window. It can also be seen that the closing threshold defines, using the luteal phase probability, the end of the time interval of using contraception.

It should be noted that, in the description, the sequence of the steps has been presented in a specific order, one skilled in the art will understand, however, that the order of at least some of the steps could be altered, without deviating from the scope of the invention.

What is claimed is:

1. A method for determining for a female a time interval for using contraception, the method comprising:
    receiving, in a processor, from a sensor system of a wearable device of the female, physiological data of the female;
    generating, by the processor, cycle phase probabilities of the female being in one or more cycle phases of her menstrual cycle on a given day, by use of a machine learning model and the physiological data, the cycle phases comprising an early follicular phase, a fertile window, and/or a luteal phase;
    determining, by the processor, the time interval for using contraception using the physiological data, the cycle phase probabilities, and pre-determined cycle phase probability thresholds; and
    generating, by the processor, a message for the female comprising the time interval for using contraception.

2. The method according to claim 1, wherein receiving the physiological data comprises the processor receiving one or more of: skin temperature data, breathing rate data, resting pulse rate data, heart rate variability data, perfusion data, and pulse wave analysis data.

3. The method according to claim 1 or 2, wherein generating the cycle phase probabilities comprises the processor:
    recording the physiological data for one or more menstrual cycles in a physiological data log; and
    generating the cycle phase probabilities by use of the machine learning model, the physiological data, and the physiological data log.

4. The method according to claim 1 or 2, wherein generating the cycle phase probabilities comprises the processor training the machine learning model to generate the cycle phase probabilities using machine learning and a training dataset of physiological training data of a large group of females.

5. The method according to claim 1 or 2, wherein generating cycle phase probabilities comprises the processor using the machine learning model based on a neural network.

6. The method according to claim 5, wherein generating the cycle phase probabilities comprises the processor using the neural network with one or more of: a one-dimensional convolutional layer and a recurrent layer.

7. The method according to claim 5, wherein generating the cycle phase probabilities comprises the processor using the neural network with one or more one-dimensional convolutional layers configured to determine short-term features of an input data sequence of the physiological data, by generating a current output $h_i$ using a one-dimensional convolution of kernel size three, the one-dimensional convolution being modified to be solely retrospective by having as inputs input data terms $x_{i-2}$, $X_{i-1}$, and $x_i$ of the input data sequence, where the index i denotes time.

8. A computer system for determining for a female a time interval for using contraception, the computer system comprising a processor configured to:
    receive, from a sensor system of a wearable device of the female, physiological data of the female;
    generate cycle phase probabilities of the female being in one or more cycle phases of her menstrual cycle on a given day, by use of a machine learning model and the physiological data, the cycle phases comprising an early follicular phase, a fertile window, and/or a luteal phase;

determine the time interval for using contraception using the physiological data, the cycle phase probabilities, and pre-determined cycle phase probability thresholds; and generate a message for the female comprising the time interval for using contraception.

9. The computer system according to claim 8, wherein the processor is configured to receive one or more of:

skin temperature data, breathing rate data, resting pulse rate data, heart rate variability data, perfusion data, and pulse wave analysis data.

10. The computer system) according to claim 8 or 9, wherein the processor is further configured to:

record the physiological data for one or more menstrual cycles in a physiological data log; and generate the cycle phase probabilities by use of the machine learning model, the physiological data, and the physiological data log.

11. The computer system according to claim 8 or 9, wherein the processor is further configured to train the machine learning model to generate the cycle phase probabilities using machine learning and a training dataset of physiological training data of a large group of females.

12. The computer system according to claim 8 or 9, wherein the processor is configured to use the machine learning model based on a neural network.

13. The computer system according to claim 12, wherein the processor is configured to use the neural network with one or more of: a one-dimensional convolutional layer and a recurrent layer.

14. The computer system according to claim 12, wherein the processor is configured to use the neural network with one or more one-dimensional convolutional layers configured to determine short-term features of an input data sequence of the physiological data, by generating a current output $h_i$ using a one-dimensional convolution of kernel size three, wherein the one-dimensional convolution is modified to be solely retrospective by having as inputs input data terms $x_{i-2}$, $X_{i-1}$, and $x_i$ of the input data sequence, where the index i denotes time.

15. A computer program product comprising a non-transitory computer-readable medium having stored thereon computer program code configured to control a processor of a computer such that the computer performs the steps:

receiving from a sensor system of a wearable device of a female, physiological data of the female;

generating cycle phase probabilities of the female being in one or more cycle phases of her menstrual cycle on a given day, by use of a machine learning model and the physiological data, the cycle phases comprising an early follicular phase, a fertile window, and/or a luteal phase;

determining a time interval for using contraception using the physiological data, the cycle phase probabilities, and pre-determined cycle phase probability thresholds; and generating a message for the female comprising the time interval for using contraception.

* * * * *